(12) United States Patent
Teicher

(10) Patent No.: US 8,489,449 B2
(45) Date of Patent: Jul. 16, 2013

(54) SYSTEM AND METHOD FOR RECEIVING AND REDEEMING LOYALTY INCENTIVES

(75) Inventor: Mordechai Teicher, Hod Hasharon (IL)

(73) Assignee: Cardis Enterprises International N.V., Antilles, Curacao (AN)

( * ) Notice: Subject to any disclaimer, the term of this patent is extended or adjusted under 35 U.S.C. 154(b) by 2471 days.

(21) Appl. No.: 10/276,682

(22) PCT Filed: Jan. 23, 2002

(86) PCT No.: PCT/IL02/00064
§ 371 (c)(1),
(2), (4) Date: Nov. 18, 2002

(87) PCT Pub. No.: WO02/063410
PCT Pub. Date: Aug. 15, 2002

(65) Prior Publication Data
US 2003/0115100 A1    Jun. 19, 2003

Related U.S. Application Data

(60) Provisional application No. 60/265,865, filed on Feb. 5, 2001.

(51) Int. Cl.
*G06Q 30/00* (2012.01)
(52) U.S. Cl.
USPC .................................................... 705/14.1

(58) Field of Classification Search
USPC .................................................. 705/14, 14.1
See application file for complete search history.

(56) References Cited

U.S. PATENT DOCUMENTS

| | | | | |
|---|---|---|---|---|
| 5,530,232 A * | 6/1996 | Taylor | ............................ | 235/380 |
| 5,744,787 A * | 4/1998 | Teicher | ......................... | 235/380 |
| 6,330,978 B1* | 12/2001 | Molano et al. | ................ | 235/492 |
| 6,594,640 B1* | 7/2003 | Postrel | ....................... | 705/14.27 |

* cited by examiner

*Primary Examiner* — Daniel Lastra
(74) *Attorney, Agent, or Firm* — Dainel J. Swirsky; AlphaPatent Associates Ltd.

(57) ABSTRACT

A system for managing loyalty incentives for a customer, including a personal loyalty account at a centralized server assigned to the customer for storing the balance of a first amount of loyalty incentives for the customer, a loyalty card carried with the customer for identifying and accessing the personal loyalty account and including a loyalty purse for storing a second amount of loyalty incentives, a first merchant terminal operable to interface with the loyalty card for awarding the customer an awarded amount of loyalty incentives by selecting whether to add the awarded amount to the loyalty purse or to add a first predefined amount of loyalty incentives to the loyalty account and receive the difference between the first predefined amount and the awarded amount from the loyalty purse.

18 Claims, 4 Drawing Sheets

SYSTEM AND METHOD FOR RECEIVING AND REDEEMING LOYALTY INCENTIVES

CROSS-REFERENCE TO RELATED APPLICATIONS

This application is a U.S. National Phase Application under 35 U.S.C. 371 of PCT International Application No. PCT/IL02/00064, which has an international filing date of Jan. 23, 2002, and which claims the benefit of U.S. Provisional Patent Application No. 60/265,865, filed on Feb. 5, 2001.

FIELD AND BACKGROUND OF THE INVENTION

The present invention relates in general to customer loyalty programs, and, in particular, to such programs involving a customer card for receiving and redeeming loyalty incentives.

Loyalty programs are in common use and have become an inseparable part of modern retail commerce. Consumers are encouraged to make certain purchases and/or to patronize certain vendors by virtue of the loyalty incentives offered to them for making those purchases with those vendors. The benefits to the merchants are in increased repeat business and in gaining an improved understanding of the preferences and behavior of their customer. The benefits to the consumers are in redeeming their accumulated incentives for various bonuses and premiums. Such bonuses and premiums include, but are not limited to, free products, services, and discounts. Consumers may also earn loyalty incentives in ways other than by making purchases, such as by filling out questionnaires and by participating in market promotion activities. The quantity of loyalty incentives are typically expressed to consumers in non-monetary terms, non-limiting examples of which are "points" and "air-miles". By not identifying loyalty incentives as having explicit monetary values to consumers, merchants gain considerable freedom in using the loyalty incentives in their business.

A loyalty program is denoted as "open" when more than a single vendor participates. This is the case, for example, when purchases in a supermarket, a hardware store, and a drugstore earn "air-miles" redeemable for tickets issued by a participating airline. An open loyalty program includes a number of vendors who form a group which is herein denoted as a "loyalty coalition". As another example, suppose a supermarket in a loyalty coalition wishes to conduct a promotional campaign on a particular item. The supermarket might make a special offer to its customers whereby they can purchase two such items for the price of a single item plus 500 points. The customers may have earned these points by shopping at the supermarket, or they may have earned them elsewhere, such as by shopping at the hardware store. In any case, customers can purchase a single such item at the supermarket, and by redeeming 500 of their loyalty points, get an additional item "free of charge". In a similar manner, the hardware store can also conduct promotions to redeem points earned by the consumer when shopping at the supermarket. In reality, of course, it is the consumer who ultimately pays entirely for the points and the items for which they can be redeemed. However, by disassociating the loyalty points from monetary value, the consumer is given the impression that he has "earned" these points without work, simply by participating in the loyalty program, and that consequently they are "free" and the items he can obtain by redeeming them are also "free". In contrast, if the loyalty points were expressed in conventional monetary terms, not only would merchants have far less flexibility in using these loyalty incentives to promote their businesses, but the consumers would be made acutely aware that the entire cost of the loyalty program is coming out of their pockets in terms of higher overall prices. This would draw more attention to pricing, invite more serious comparison shopping, and would defeat the purpose of the loyalty incentives. Thus, the clear separation of loyalty incentives from monetary value at the consumer level is an important marketing consideration in any loyalty program.

In an open loyalty program, because it is possible to redeem loyalty points earned from one vendor via another vendor, a centralized online database of loyalty points is usually established to manage points, transactions therewith, and inter-vendor settlements. Inter-vendor settlements are used to compensate vendors who redeem points from vendors who have granted these points to their customers. The settlement is usually based on monetary equivalents at an arbitrary predetermined exchange rate. For example, 100 points may have a monetary value of $1.00. Exchange rates can also involve more complex formulas and schedules.

Examples of loyalty-related prior art can be found in U.S. Pat. Nos. 5,689,100; 5,774,870; 5,806,045; 5,905,246; 5,974,399; 5,991,376; 6,003,013; 6,009,415; 6,061,660; 6,119,933; 6,138,911.

Another area of interest to the present invention is the management of micropayments in conjunction with credit and debit accounts (herein collectively denoted as "charge accounts" for making "charge payments"). Credit and debit involve per-transaction processing costs that are independent of the transaction size. The banking industry, however, collects transaction fees that are usually related to the transaction size. This makes smaller transactions unattractive or even economically prohibitive for the banks. For example, if processing costs are 30¢ and the merchant pays a fee of 3% of the transaction size, then a transaction below $10 will yield a loss for the banks. The well-known technology of "stored value" uses secure chips (such as are contained in "smart cards" and mobile telephones) to store and transfer value without incurring any per-transaction overhead. A specific approach for using stored value to buffer credit and debit transactions is described in U.S. Pat. No. 5,744,787, U.S. Pat. No. 6,076,075, U.S. Pat. No. 6,065,675, and U.S. Pat. No. 6,119,946, all of which are incorporated by reference as if set forth fully herein.

As previously noted, open loyalty incentive processing usually requires a centralized database. Management of an open loyalty system involves both maintaining individual consumer loyalty accounts as well as inter-merchant accounting for settlement. Although the consumer loyalty accounts are denominated in terms of "points", "air-miles", and the like, merchant accounting is expressed in terms of money, and inter-merchant transactions are monetary-based. Databases for managing loyalty programs thus require computing, communication, and security that are similar to those used for regular monetary systems, in addition to capabilities not found in regular monetary systems. The larger the scale of a loyalty coalition in terms of the number and diversity of participating vendors, the more demanding are the associated loyalty databases and networks. Therefore, a limitation of prior art open loyalty program processing systems built around centralized databases is that they are not easily scalable. Adding new vendors is not easy, and as the system grows the complexity becomes greater, more burdensome, and harder to manage.

There is thus a widely recognized need for, and it would be highly advantageous to have, a system and method for open loyalty program processing that can efficiently and economically handle large numbers of diverse merchants and large numbers of participating consumers, and in such a manner that increasing the number and variety of participants does not increase the complexity of the system. These goals are met by the present invention.

SUMMARY OF THE INVENTION

The main object of the present invention is to provide a system for handling loyalty programs that makes use of conventional banking systems for value storage and settlement of loyalty incentives. A second object is to use smart-card based stored value for buffering small value transfers in order to reduce the processing costs for incentive earning and redemption and for inter-merchant settlement.

IT would be appreciated that even though loyalty incentives are customarily expressed in non-monetary terms (e.g., "points"), an open loyalty program must ultimately be founded on true monetary principles, and must ultimately be based on conventional monetary value. Accordingly, any system for open loyalty programs can be suitable for incorporation within the conventional banking system. From such a perspective, for example, a customer having 20,000 loyalty points may actually have $200 of redeemable value, and this redeemable value can be held in a special personal bank account. However, because of the restricted nature of such an account (for loyalty incentive earning and redemption), the customer cannot directly access the account for conventional deposits or withdrawals. The customer can add value only by earning incentive points upon purchases or other promoted activities, and can withdraw value only via redemption of points with a vendor. As noted previously, for marketing purposes, the value earned, accumulated, or redeemed is presented to the customer in terms such as points or air-miles rather than dollars. However, the value transacted among the merchants is a true monetary value. The awarding of loyalty incentives to consumers, therefore, can be considered monetarily as a kind of "refund", and this term is also used herein to denote the awarding of loyalty "points". Likewise, the redeeming of loyalty incentives by consumers can be considered monetarily as a kind of "payment", and this term is also used herein to denote the redemption of loyalty "points".

It is also important to realize that loyalty incentives earned by consumers are typically at micropayment levels, even if they are associated with larger transactions. For example, a consumer might spend $50, but earn loyalty points worth only 50¢ or less. As is done in the prior art (for example, in U.S. Pat. No. 5,806,045), the present invention uses stored value to allow managing these small values economically.

A first aspect of the present invention provides a loyalty program management system including a banking system for maintaining loyalty accounts, which are assigned to customers and which are denominated in conventional monetary terms. Money is transferred to and from a loyalty account via loyalty transactions (for both earning and redemption) with merchants.

A second aspect of the present invention provides a stored value device for customers, herein denoted as a "loyalty purse", that buffers small loyalty transactions until they reach a predetermined threshold. The loyalty purse is contained in a loyalty card that also includes the details of the customer's loyalty account in the banking system. The loyalty card can be implemented as part of the customer's payment card, or can be included in a separate card or another portable device such as a key ring or a mobile telephone. Thus the term "card" should be interpreted within the context of the present invention very broadly to cover any device personal to a customer and capable of identifying the customer's loyalty account and including a loyalty purse.

A third aspect of the present invention provides merchant payment terminals enhanced to automatically handle loyalty earning and redemption under a predefined set of rules.

A fourth aspect of the present invention provides a combination stored-value system for buffering loyalty transactions and for simultaneously serving as a stored-value system for making micropayments in the same retail environment and using the same banking system.

Therefore, according to the present invention there is provided a system for issuing, storing, and redeeming loyalty incentives including a loyalty account denominated in conventional monetary units.

In addition, according to the present invention there is provided a method for issuing loyalty incentives within a system having a loyalty account, a loyalty purse, and a set of loyalty rules, the method including the steps of: (a) converting the loyalty incentives into a conventional monetary value; (b) determining whether the loyalty purse can accept the conventional monetary value according to a first predetermined amount; (c) transferring the conventional monetary value into the loyalty purse if the loyalty purse can accept the conventional monetary value; and (d) transferring a second predetermined amount into the loyalty account and transferring the difference between the second predetermined amount and the conventional monetary value from the loyalty purse if the loyalty purse cannot accept the conventional monetary value.

Furthermore, according to the present invention there is provided a method for redeeming loyalty incentives within a system having a loyalty account, a loyalty purse, and a set of loyalty rules, the method including the steps of: (a) converting the loyalty incentives into a conventional monetary value; (b) determining whether the loyalty purse should pay the conventional monetary value according to a first predetermined amount and transferring the conventional monetary value from the loyalty account if the conventional monetary value exceeds the first predetermined amount; (c) determining whether the loyalty purse contains sufficient value to pay the conventional monetary amount; (d) transferring the conventional monetary amount from the loyalty purse if the loyalty purse contains sufficient value to pay the conventional monetary amount; and (e) transferring a second predetermined amount from the loyalty account and transferring the difference between the second predetermined amount and the conventional monetary value into the loyalty purse if the loyalty purse cannot pay the conventional monetary value.

BRIEF DESCRIPTION OF THE DRAWINGS

The invention is herein described, by way of example only, with reference to the accompanying drawings, wherein.

DESCRIPTION OF THE PREFERRED EMBODIMENTS

The principles and operation of a system and method for receiving and redeeming loyalty incentives according to the present invention may be understood with reference to the drawings and the accompanying description.

Figure 1:
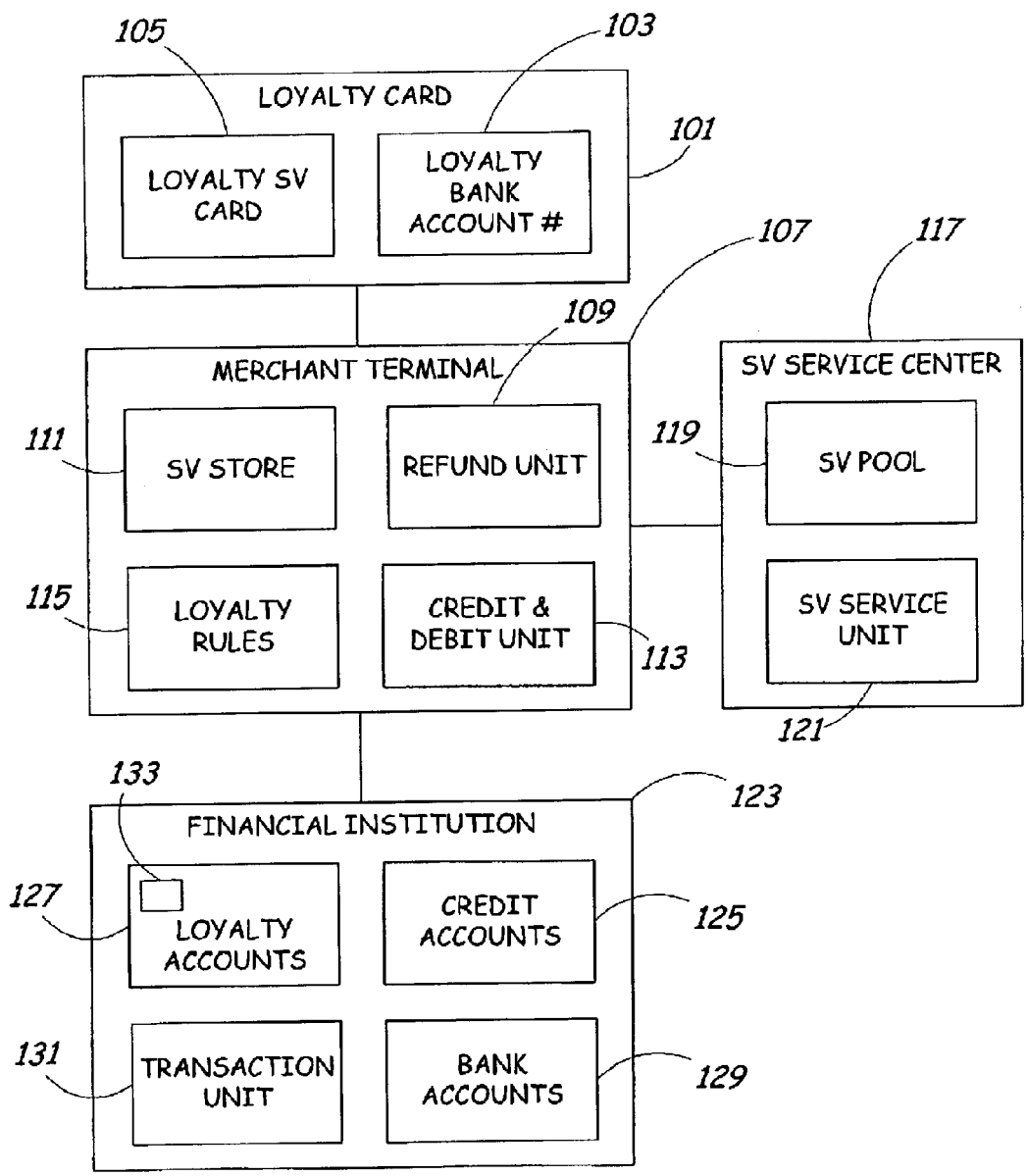
FIG. 1 illustrates a block diagram of a system for handling a loyalty program according to the present invention, with a stand-alone stored-value service center.

FIG. 1 illustrates an overall block diagram of a first embodiment of the present invention, which effects a stand-alone system for managing an open loyalty program. A loyalty card 101 is associated with a loyalty bank account number 103 and contains a loyalty stored-value purse 105. Loyalty card 101 is capable of interfacing with a merchant terminal 107, which contains a refund unit 109, a stored-value store 111, a credit and debit unit 113, and has access to a set of loyalty rules 115. Merchant terminal 107 interfaces with a stored-value service center 117 which contains a stored-value pool 119 and a stored-value service unit 121. Merchant terminal 107 also interfaces with a financial institution 123, which has credit accounts 125, loyalty accounts 127, bank accounts 129, and a transaction unit 131. In this embodiment of the invention, stored-value service center 117 is separate and from, and independent of, financial institution 123. A loyalty bank account 133 corresponds to loyalty bank account number 103 and is denoted herein as the "associated loyalty bank account" of loyalty card 101. The consumer who holds loyalty card 101 also holds loyalty bank account 133. Loyalty card 101 includes preferably also a register (not shown) to mirror the balance in the respective loyalty account having account number 103, to ease checking, upon redemption, whether the customer has an overall sufficient amount of loyalty incentives.

As previously noted, although loyalty incentives are presented to consumers in terms of "points" or other non-monetary units, from a business perspective regarding the underlying foundation of the loyalty program, loyalty incentives must be expressible in conventional monetary terms. Consequently, all stored value in the system of the present invention, such as in loyalty card 101 and in stored-value pool 119, is maintained in conventional monetary units (e.g., dollars and cents), and such conventional monetary units are employed exclusively in all loyalty transactions between loyalty card 101 and merchant terminal 107, as well as between merchant terminal 107 and financial institution 123 and between merchant terminal 107 and stored-value service center 117. The use of conventional monetary units within the system of the present inventions, however, is transparent to the consumer. Consumers, for example, never see the contents of loyalty stored-value purse 105 or the actual balances of loyalty accounts 127. Instead, consumers would see only the "points", "air-miles", etc., as converted from their actual monetary values, such as by loyalty rules 115. Conversely, loyalty "points", "air-miles", etc., are converted into corresponding conventional monetary value for use within the system, such as by loyalty rules 115. To facilitate the use of conventional monetary units, the system has a predetermined minimum, or "elementary monetary unit" (EMU). All storage and transfers of value in the system are in multiples of the EMU. As a non-limiting example strictly for the purposes of illustration herein, the predetermined EMU is 1¢ ($0.01). Other values are also possible.

Regarding loyalty card 101, it is above noted that loyalty bank account number 103 relates to loyalty bank account 133. Furthermore, one of the features of the present invention is that loyalty stored-value purse 105 has preferably a predetermined maximum capacity. In keeping with the discussion above, such a predetermined maximum capacity is expressed solely in terms of conventional monetary values. As a non-limiting example strictly for the purposes of illustration herein, the predetermined maximum capacity is $24.99. Other values are also possible. In operation, loyalty stored-value purse 105 works in conjunction with loyalty bank account 133. Loyalty bank account 133 can contain value in arbitrary multiples of the EMU. The consumer who holds loyalty card 101 and loyalty bank account 133 holds loyalty incentives represented by monetary value equal to the sum of the value in loyalty stored-value purse 105 and loyalty bank account 133. For example, loyalty incentives totaling $57.26 could be represented by $50 in loyalty bank account 133 and $7.26 in loyalty stored-value purse 105, although any other combination is also possible, such as $57.20 in loyalty bank account 133 and 6¢ in loyalty stored-value purse 105. One of the advantages of a system according to the present invention is that only the limited value of loyalty incentives stored in stored-value buffer 105 are at risk in case of theft, loss, or damage to loyalty card 101. Large values of loyalty incentives would be stored in loyalty bank account 133, where they would be safe from such risks.

Settlement between merchants is facilitated by stored-value service center 117. Merchant terminal 109 obtains stored value from stored-value pool 119 when needed to transfer loyalty incentives to loyalty card 101 based on the customer's purchases (or participation in other rewarded activities) and in accordance with loyalty rules 115, or as "change" during a redemption transaction (described below). Merchants pay stored-value service center 117 for such stored-value at face monetary value plus a pre-negotiated service charge. Conversely, a merchant who receives excessive accumulated loyalty incentives from customers (through redemption or "change" during an issuing transaction, as also described below) is covered by having merchant terminal 107 send excessive received value to stored-value pool 119. Merchants are reimbursed by stored-value service center 117 for such stored-value at face monetary value less a pre-negotiated service charge. Merchants who pay out more loyalty incentives in the form of stored value than they receive would tend to purchase a net amount from stored-value service center 117, whereas merchants who receive more than they pay out would tend to sell a net amount to stored-value service center 117. In practice, however, a certain amount of such stored value would be retained by merchant terminal 107 in refund unit 109.

In the case of a merchant who receives approximately the same amount of stored value loyalty incentives as he pays out, for example, refund unit 109 would need to hold only enough to cover the statistical fluctuations, in which case only a minimal amount of transactions need be conducted with stored-value service center 117. Transactions between merchant terminal 107 and stored-value service center 117 are monitored and controlled by stored-value service unit 121. Similarly, transactions involving loyalty accounts 127 are monitored and controlled by transaction unit 131.

As discussed previously, loyalty card 101 can be implemented by a variety of chip technologies known in the art, and may be embodied in a variety of devices including, but not limited to, smart cards and mobile telephones. Loyalty stored-value purse 105 can contain stored value in various ways. The simplest way is to represent the number of EMU's in a register. For example, $7.26 in loyalty stored-value purse 105 could be represented by the number 726 for a 1¢ EMU. Alternatively, the loyalty incentives could be stored in the form of tokens such as "electronic coins", as disclosed in U.S. Pat. No. 6,119,946.

In a practical loyalty program, there will be a number of consumers, each of which has his or her own loyalty card and loyalty bank account. In addition, in an open loyalty program, there will be a number of merchants, each of which has his or her own merchant terminal. A single financial institution 123 can support a large number of merchants and consumers, but it is possible to have more than one financial institution. A single stored-service center can support a large number of merchants. For efficiency it is desirable that there be a single stored-value service center, but more than one stored-value service center is also possible.

Furthermore, it should be noted that multiple sets of loyalty rules 115 can be supported by the present invention. Each set of loyalty rules 115 covers two different characteristics of loyalty incentives:

1. The issuing of "points" to a consumer based on the product(s) or service(s) purchased and/or the size of the transaction and/or the accumulated sales volume of that consumer at a specific merchant's site, and the redeeming of such "points" for product(s) and/or service(s) and/or discounts at a specific merchant's site;
2. The conversion between "points" and conventional monetary units.

The first characteristic above is at the discretion of each merchant and does not affect the system globally. The second characteristic, however, affects the system in that redemption of points by a particular merchant would have to be based on a conversion rate that is similar to the conversion rate in effect at the time of issuing. Otherwise, a consumer could earn "cheap" points by shopping at one merchant, and redeem them as "expensive" points elsewhere. Such a condition would clearly not benefit the stability and economic viability of the overall loyalty program. On the other hand, it is often desirable to structure the incentives in one loyalty program on a different basis from the incentives in another program. Clearly, one program which awards "air-miles" as a loyalty incentive should not have to structure them in precisely the same manner as the nondescript "points" of another program. In the former case, "air-miles" represent something relatively tangible to the consumer (albeit of unspecified monetary value), whereas "points" are completely vague and fluid. In a similar manner, different loyalty programs can give different values to "points". One loyalty program, for example, might award consumers 1,000 "silver points" for each dollar spent, whereas a competing loyalty program may structure the incentives to award 5,000 "gold points" for each dollar spent. Such programs are not compatible: a consumer who earns "gold points" at one merchant cannot redeem them at a merchant who participates in the "silver points" program. Despite this, however, the system of the present invention is capable of handling such diverse loyalty programs simply by issuing a separate loyalty card 101 to the consumer for each different program. Although the consumer can thereby have multiple loyalty purses, this need not be a burden to manage, because the various loyalty purses can be incorporated into the same device. A single smart card, for example, could contain a number of separate loyalty purses according to the present invention. In this manner, the consumer could conveniently shop at whatever merchants he or she wishes, and accumulate and redeem the relevant loyalty incentives as appropriate. In all cases, however, because the loyalty incentives are based on the same conventional monetary units, the same stored-value service center 117 and the same financial institution 123 can support all the different loyalty programs equally well. It is even possible, subject to marketing considerations and the cooperation between loyalty programs, to convert among the different loyalty incentives. For example, a consumer might wish to convert "silver points" to "gold points" at a ratio of 5 to 1. Although the consumer would visualize the conversion in such terms, the actual conversion within a system of the present invention is much simpler, and would involve only a transfer of a given monetary value from the consumer's "silver point" loyalty bank account to his "gold point" loyalty bank account on a straight 1-to-1 basis, subject perhaps to optional fees.

Figure 2:
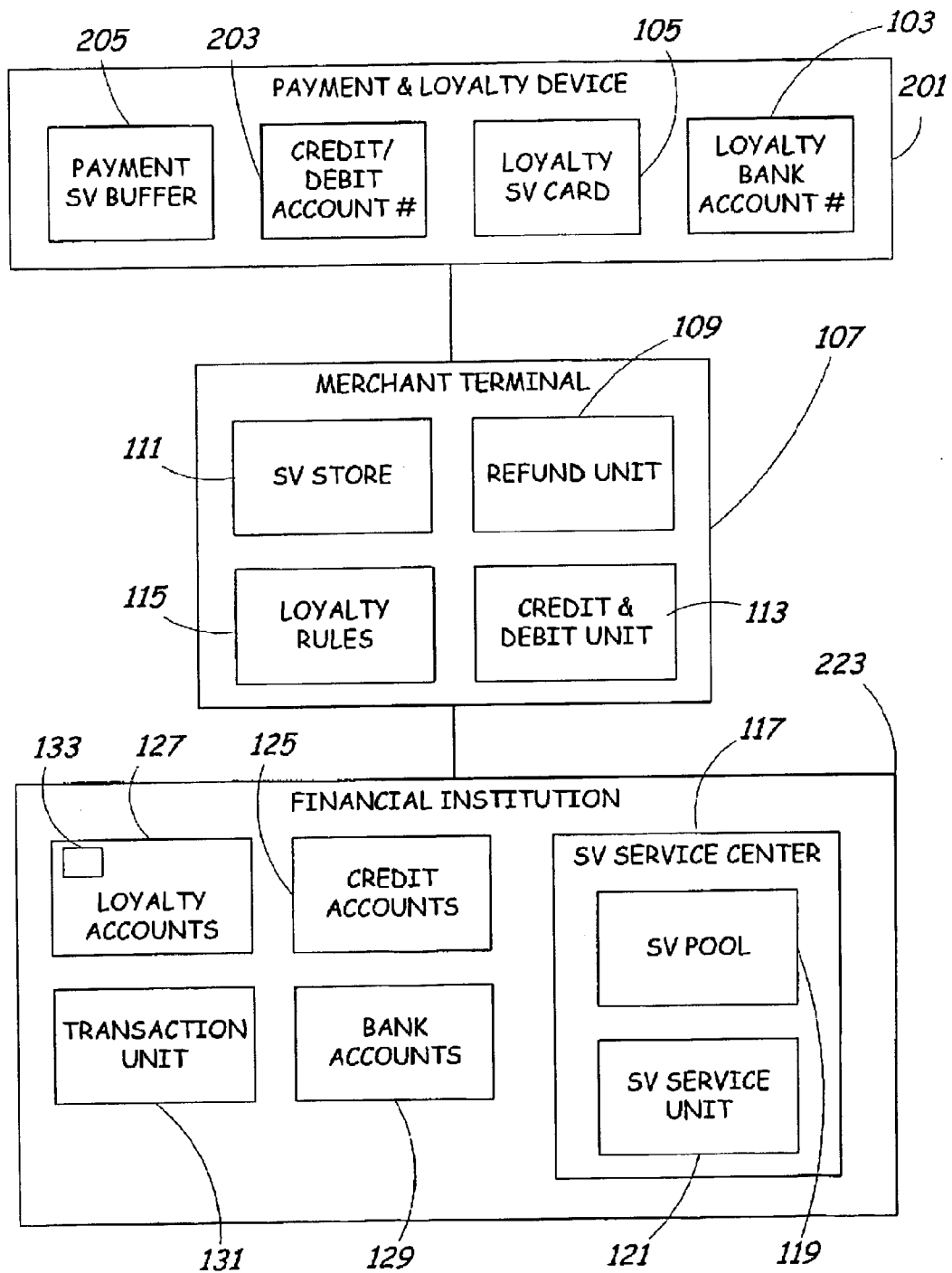
FIG. 2 illustrates a block diagram of a system for handling a loyalty program integrated with a system for handling micropayments according to the present invention, with a stored-value service center integrated into the micropayment processing system.

Credit and debit unit 113, credit accounts 125, and bank accounts 129 are not involved in the matter of loyalty incentives, and in the first embodiment of the present invention, as described above, do not participate in the functioning of the system. In contrast, however, FIG. 2 illustrates a second embodiment of the present invention, in which a system for handling loyalty incentives is combined with a system for handling micropayments, as is disclosed in U.S. Pat. No. 5,744,787. The components of this combined system are the same as illustrated in FIG. 1 and described above, with the addition of a payment stored-value buffer 205 and a debit/credit account number 203 contained in an combined payment and loyalty device 201. As with loyalty card 101 as discussed previously, payment and loyalty device 201 may be realized in a variety of embodiments, including, but not limited to, smart cards and mobile telephones. Furthermore, as previously noted, stored-value service center 117 is shown as a component of an expanded financial institution 223, instead of a completely stand-alone facility as in FIG. 1. The operation of payment and loyalty device 201 for making micropayments in conjunction with merchant terminal 107 (including credit and debit unit 113), in conjunction with credit accounts 125 and bank accounts 129, and in conjunction with stored-value service center 117 (including stored-value pool 119 and stored-value service unit 121) is described in detail in U.S. Pat. No. 5,744,787. The overall function of the loyalty-related components of payment and loyalty device 201 (loyalty bank account number 103 and loyalty stored-value purse 105), merchant terminal 107 (refund unit 109, stored-value store 111, and loyalty rules 115), and financial institution 223 (loyalty accounts 127, loyalty bank account 133, and transaction unit 131) as well as stored-value service center 117 (including stored-value pool 119 and stored-value service unit 121) have been discussed above with reference to FIG. 1. As illustrated in FIG. 2, however, it is possible to combine the functioning of these components in such a way that stored-value store 111 and stored-value service center 117 (including stored-value pool 119 and stored-value service unit 121) operate simultaneously with both the micropayment function and the loyalty function of payment and loyalty device 201. In particular, the same stored-value units apply for both loyalty stored-value purse 105 and payment stored-value buffer 205. This holds even in the case of multiple loyalty stored-value purses and multiple loyalty bank accounts to support multiple loyalty programs, as described above (such as in the case of "silver points", "gold points", "air-miles", etc.). Furthermore, if a countable monetary system using "electronic coins" is employed for the storage and transfer of value (such as that disclosed in U.S. Pat. No. 6,119,946), the same "electronic coins" may be used both for micropayments and for loyalty incentives. The benefits of such a combination stem from the ability to simultaneously use the same banking infrastructure and resources for both a payment system and for diverse loyalty programs, thereby achieving additional savings and economy and convenience over prior art systems which require duplicated facilities for managing payment and loyalty. It is emphasized that this combination and its benefits are an unexpected result that derives from the novelty of the present invention, wherein loyalty programs and methodologies are viewed as principally monetary in nature, with only a conversion from monetary units to loyalty incentives according to loyalty rules 115 for presentation to the consumer, rather than principally non-monetary in nature, as is done in the prior art.

The operation of a system according to the present invention for issuing, storing, transferring, and redeeming loyalty incentives (such as illustrated in FIG. 1 and FIG. 2) is described in detail below.

Figure 3:
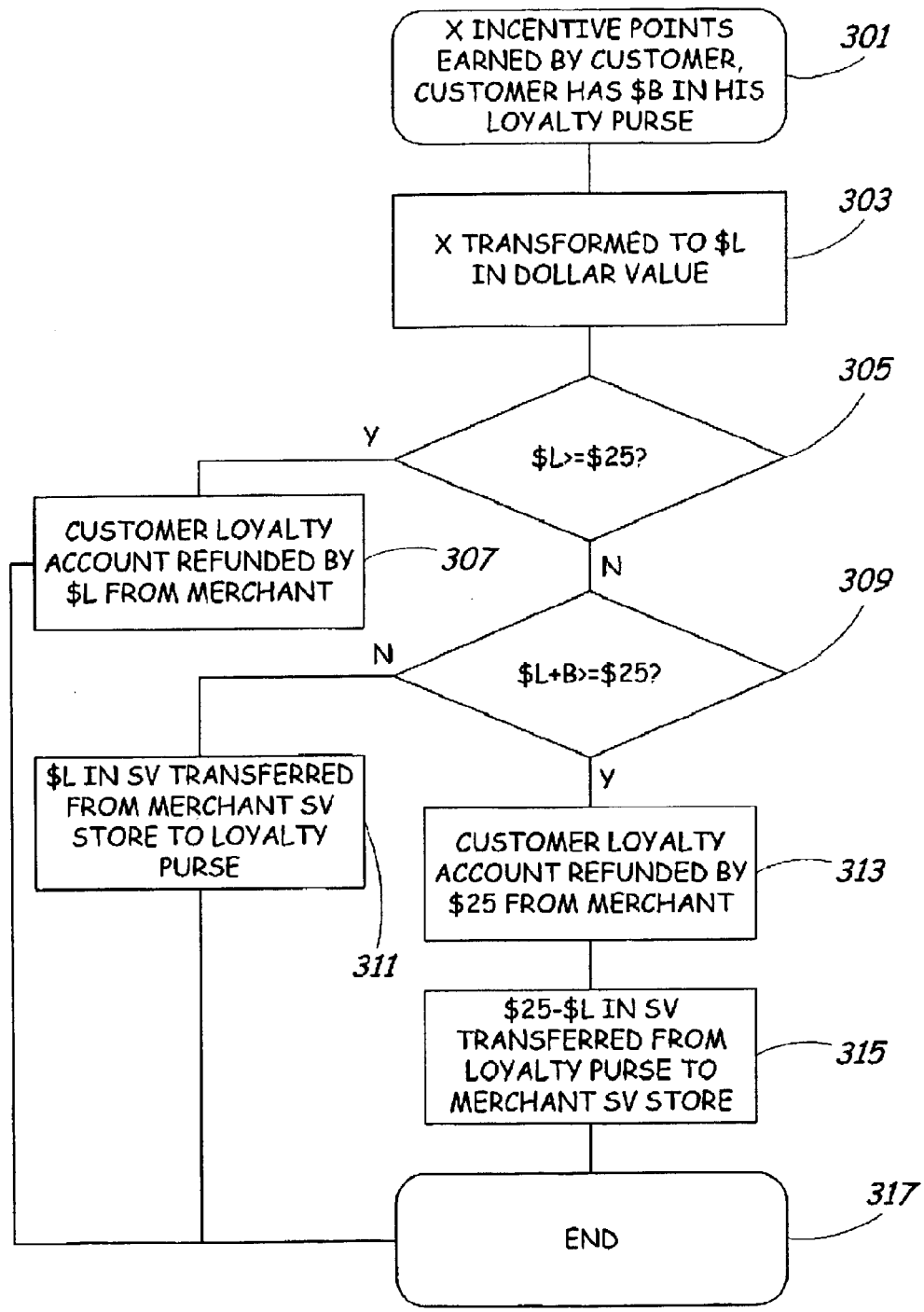
FIG. 3 is a flow-chart illustrating how a customer earns loyalty points according to the present invention.

FIG. 3 is a flow-chart illustrating a method according to the present invention for issuing loyalty incentives to a customer. The method begins with the awarding of X loyalty incentive points to the customer at a starting point 301. This would be in accordance with loyalty rules 115 (FIG. 1 and FIG. 2), as discussed previously. At this point, it is assumed that the customer's loyalty card 101 (or alternatively, payment and loyalty device 201) contains some value, $B (in loyalty stored-value purse 105). It is emphasized that $B is denominated in conventional monetary units. Note, however, that $B may be zero, but never exceeds the predetermined maximum capacity of loyalty stored-value purse 105. For this non-limiting example, the predetermined maximum capacity of loyalty stored-value purse 105 is $24.99.

Next, in a step 303, the X points earned by the customer are converted into conventional monetary units according to loyalty rules 115, and this transformed value is represented here as $L. At a decision point 305, it is determined if $L equals or exceeds $25. Because loyalty incentives are typically of small value, it is overwhelmingly probable that $L is less than $25. However, for the case of purchases of high value, e.g. an airline ticket or a car, the system places no restrictions on X or $L and so decision point 305 handles all cases. In the event that $L exceeds the predetermined maximum capacity of loyalty stored-value purse 105, merchant terminal 107 refunds $L into the customer's loyalty bank account 133 in a step 307, after which the method terminates at an end point 317.

If, however (as is most likely), $L is less than $25, a decision point 309 is executed. At decision point 309, it is determined whether $L+$B would exceed the predetermined maximum capacity of loyalty stored-value purse 105. It is recalled that loyalty stored-value purse 105 already contains $B of stored value, and if $L+$B equals or exceeds $25 (in this example), then it is not possible to put $L into loyalty stored-value purse 105. If, however, $L+$B does not exceed $25, it is possible to put $L into loyalty stored-value purse 105, and in this case, a step 311 is executed to transfer (refund) $L into loyalty stored-value purse 105 from stored-value store 111, after which the method terminates at end point 317.

In the event that $L+$B equals or exceeds $25 (and it is not possible to put $L into loyalty stored-value purse 105), then the refund of $L is accomplished in a step 313 followed by a step 315. In step 313, the customer's loyalty bank account 133 is refunded $25 from merchant terminal 107, and in step 315, the difference $25−$L is transferred from loyalty stored-value purse 105 into stored-value store 111 as "change". At this point, the customer has received a net $L equivalent to X in loyalty "points" through a refund to loyalty bank account 133 and a transfer of "change" from loyalty stored-value purse 105 into the merchant's stored-value store 111, after which the method terminates at end point 317.

The logic to perform the decisions 305 and 309, applying of loyalty rules 115 in transformation step 303 and refund and transfer steps 307, 311, 313, and 315 are performed by merchant terminal 107, using refund unit 109.

Figure 4:
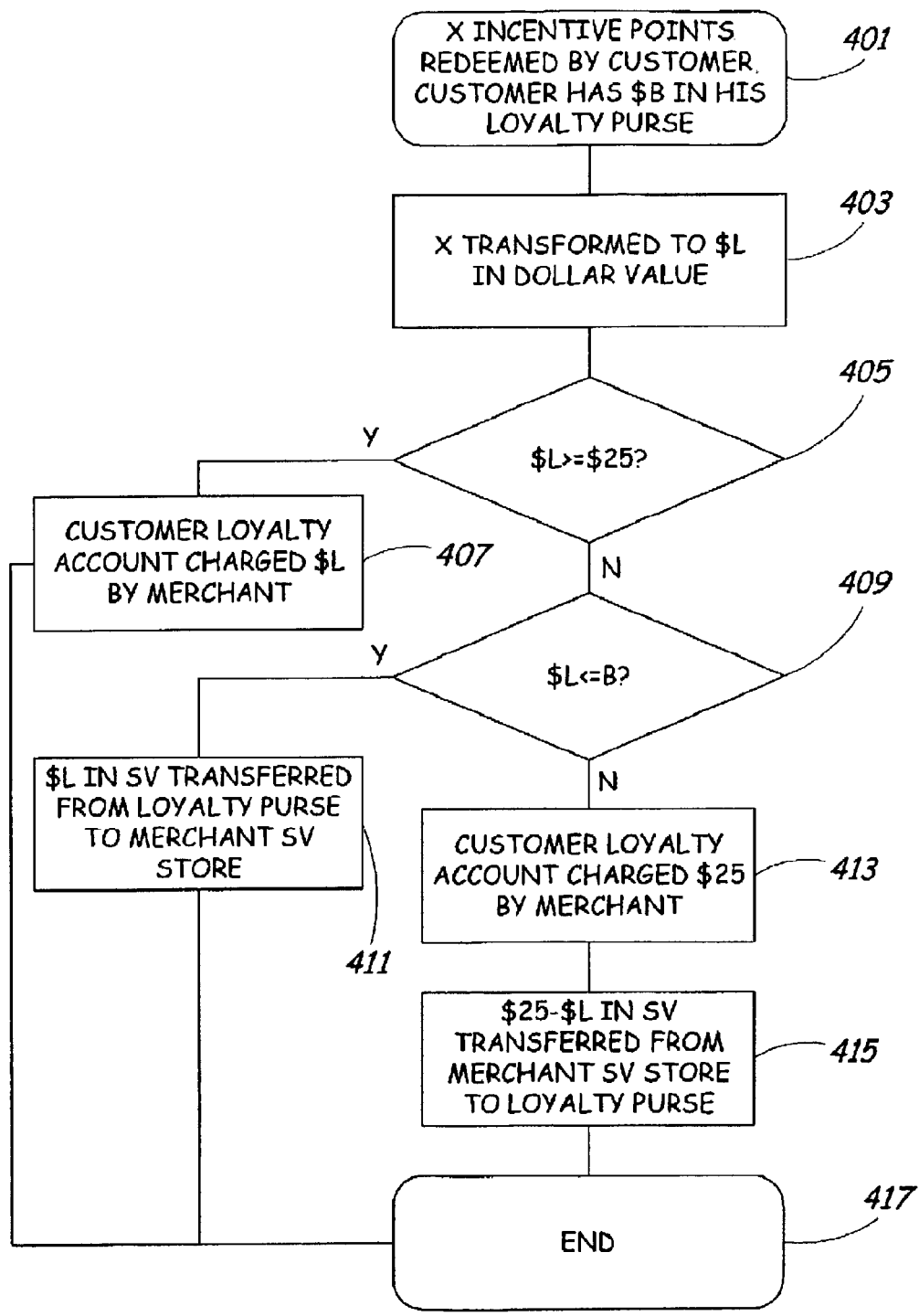
FIG. 4 is a flow-chart illustrating how a customer redeems loyalty points according to the present invention.

FIG. 4 is a flow-chart illustrating a method according to the present invention for redeeming loyalty incentives by a customer. This method is similar in many respects to the method illustrated in FIG. 3 for issuing loyalty incentives, except that it works in reverse. In this regard, the method for redeeming loyalty incentives is comparable to the payment method disclosed in U.S. Pat. No. 5,744,787, except that it involves a transformation from loyalty incentives according to loyalty rules 115, which is not involved in making normal payments. In particular, because the system of the present invention is based on monetary units, it is possible to use the same infrastructure for both loyalty programs and payments.

The method illustrated in FIG. 4 begins with a customer redeeming X incentive points, according to loyalty rules 115 (regarding the redeeming of "points" for products, services, or discounts). It is assumed that the customer has a sufficient balance in loyalty stored-value purse 105 and/or loyalty bank account 133 to cover the X incentive points, according to loyalty rules 115 (regarding the conversion of monetary units to "points"). If the customer does not have a sufficient balance to cover the X incentive points, then it is not possible to apply the method of FIG. 4.

Given that the customer has a sufficient balance, however, it is taken that the customer has $B in loyalty stored-value purse 105 at a starting point 401. It is again emphasized that $B is denominated in conventional monetary units, and that $B may be zero, but cannot exceed the predetermined maximum capacity of loyalty stored-value purse 105. Once again for this non-limiting example, the predetermined maximum capacity of loyalty stored-value purse 105 is $24.99.

Next, in a step 403, the X points to be redeemed by the customer are converted into conventional monetary units according to loyalty rules 115, and this transformed value is represented here as $L. At a decision point 405, it is determined if $L equals or exceeds $25. Unlike the example of earning loyalty incentives as illustrated in FIG. 3, the redeeming of loyalty incentives can very likely be for amounts in excess of the predetermined maximum capacity of loyalty stored-value purse 105. Thus, if $L equals or exceeds $25, in a step 407 the customer's loyalty bank account 133 is charged $L, after which the method terminates at an end point 417.

If, however, $L is less than $25, a decision point 409 is executed. At decision point 409, it is determined whether $L is less than or equal to $B. If $L is less than or equal to $B, then it is possible to perform the redemption solely from value stored in loyalty stored-value purse 105, so in a step 411 $L is transferred from loyalty stored-value purse 105 to the merchant's stored-value store 111, after which the method terminates at end point 417.

If, on the other hand, $L exceeds $B, then such a transfer cannot be made from loyalty stored-value purse 105, and the payment of $L is accomplished in a step 413 followed by a step 415. In step 413, the customer's loyalty bank account 133 is charged $25 from merchant terminal 107, and in step 415, the difference $25−$L is transferred into loyalty stored-value purse 105 from stored-value store 111 as "change". At this point, the customer has paid a net $L equivalent to X in loyalty "points" through a charge to loyalty bank account 133 and a transfer of "change" into loyalty stored-value purse 105 from the merchant's stored-value store 111, after which the method terminates at end point 417.

The logic to perform the decisions 405 and 409, applying of loyal rules 115 in transformation step 403 and payment and transfer steps 407, 411, 413, and 415 are performed by merchant terminal 107.

In some cases, $L may exceed the amount contained in the loyalty account but not the sum of that amount and the amount $B stored in the loyalty purse. In this case, Step 407 will charge the full balance of the loyalty account, and the remainder will be received from the loyalty purse (this variation is not shown in FIG. 4).

While the invention has been described with respect to a limited number of embodiments, it will be appreciated that many variations, modifications and other applications of the invention may be made.

What is claimed is:

1. A system for managing loyalty incentives for a customer, comprising:
   a. a personal loyalty account at a centralized server, assigned to the customer for storing a first amount of loyalty incentives for the customer,
   b. a loyalty card carried with the customer for identifying and accessing the personal loyalty account and including a loyalty purse for storing a second amount of loyalty incentives, and
   c. a first merchant terminal operable to interface with the loyalty card for granting the customer an awarded amount of loyalty incentives by selecting, in accordance with a first predefined amount of loyalty incentives that is independent of the awarded amount of loyalty incentives, whether:
      to add the awarded amount of loyalty incentives to the loyalty purse, or
      to add said first predefined amount of loyalty incentives to the loyalty account and receive the difference between the first predefined amount of loyalty incentives and the awarded amount of loyalty incentives from the loyalty purse.

2. The system of claim 1 wherein said first merchant terminal is also operable to select whether to add said awarded amount of loyalty incentives to said loyalty account.

3. The system of claim 1 comprising also a second merchant terminal operable to interface with said loyalty card for redeeming a requested amount of loyalty incentives by selecting, in accordance with a second predefined amount of loyalty incentives that is independent of the requested amount of loyalty incentives, whether:
   a. to receive the requested amount of loyalty incentives from said loyalty purse, or
   b. to receive said second predefined amount of loyalty incentives from said loyalty account and add the difference between the second predefined amount of loyalty incentives and the requested amount of loyalty incentives to said loyalty purse.

4. The system of claim 3, wherein said second merchant terminal is also operable to select whether to receive said requested amount of loyalty incentives from said loyalty account.

5. The system according to claims 3, wherein said second merchant terminal forms part of said first merchant terminal.

6. The system of claim 1 wherein said loyalty incentives are denominated in conventional monetary units.

7. The system of claim 6 wherein said centralized server is a banking server and said loyalty account is a monetary bank account.

8. The system of claim 6 further comprising means containing rules for converting loyalty incentives denominated in said conventional monetary units to loyalty incentives denominated in non-monetary units.

9. The system of claim 1 wherein said loyalty card forms part of a payment card.

10. A method for managing loyalty incentives for a customer, the customer having a personal loyalty account at a centralized server for storing a first amount of loyalty incentives for the customer, and a loyalty card carried with the customer for identifying and accessing the personal loyalty account and including a loyalty purse for storing a second amount of loyalty incentives, the customer accessing a first merchant terminal for receiving an awarded amount of loyalty incentives, the method comprising operating the first merchant terminal for selecting, in accordance with a first predefined amount of loyalty incentives that is independent of said awarded amount of loyalty incentives, whether:
   to transfer the awarded amount of loyalty incentives from the first merchant terminal to the loyalty purse, or
   to add said first predefined amount of loyalty incentives to the loyalty account and receive the difference between the first predefined amount of loyalty incentives and the awarded amount of loyalty incentives from the loyalty purse.

11. The method of claim 10 also comprising selecting whether to add said awarded amount of loyalty incentives to said loyalty account.

12. The method of claim 10 wherein said customer also accessing a second merchant terminal for redeeming a requested amount of loyalty incentives, the method further comprising operating said second merchant terminal for selecting, in accordance with a second predefined amount of loyalty incentives that is independent of the requested amount of loyalty incentives, whether:
   a. to receive the requested amount of loyalty incentives from said loyalty purse, or
   b. to receive said second predefined amount of loyalty incentives from said loyalty account and add the difference between the second predefined amount of loyalty incentives and the requested amount of loyalty incentives to said loyalty purse.

13. The method of claim 12 further comprising selecting whether to receive the requested amount of loyalty incentives from said loyalty account.

14. The method according to claims 12 wherein said second merchant terminal forms part of said first merchant terminal.

15. The method of claim 10 wherein said loyalty incentives are denominated in conventional monetary units.

16. The method of claim 15 wherein said centralized server is a banking server and said loyalty account is a monetary bank account.

17. The method of claim 15 further comprising transforming loyalty incentives denominated in conventional monetary units into loyalty incentives in non-monetary units under predefined rules.

18. The method of claim 10 wherein said loyalty card forms part of a payment card.

\* \* \* \* \*